Figure 1:
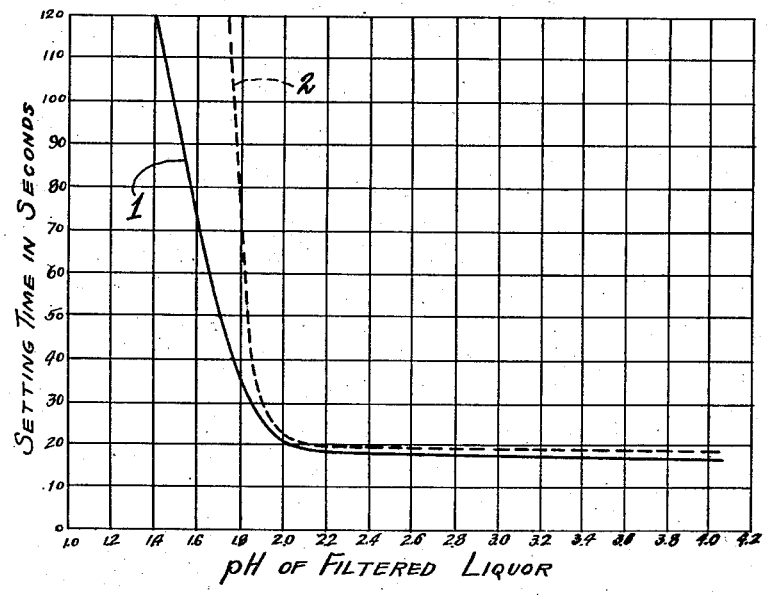

Nov. 12, 1935.  W. C. PLATT  2,020,572

METHOD OF EXTRACTING PECTIN

Filed July 29, 1929

William C. Platt, Inventor

By Lyon & Lyon, Attorneys

Patented Nov. 12, 1935

2,020,572

UNITED STATES PATENT OFFICE 2,020,572

METHOD OF EXTRACTING PECTIN

William C. Platt, Ontario, Calif., assignor to California Fruit Growers Exchange, Los Angeles, Calif., a corporation of California Application July 29, 1929, Serial No. 381,698

5 Claims. (Cl. 99—11)

This invention relates to a process of extracting pectin from cellulosic materials such as vegetables and fruits and parts of plants, to a method of treating the pectin extract, and to a pectin product resulting from the process embraced by this invention.

In general fruits and vegetables or other cellulosic bodies containing pectin are extracted with an aqueous solution usually containing a weak acid such as citric, lactic, malic, tartaric or sulphurous acid. If stronger acids are used their concentrations are kept very low. The active acidity of the extracting solution, as used in the prior art, is kept low, the pH value of the extracted liquor being generally between 2.3 and 3.5. After such extraction the process generally includes a preliminary separation of the extracted solution and the spent pulp or pomace during which the major portion of the cellulosic material is separated from the solution. This preliminary separation is generally followed by a clarification of the extracted solution by filtration, the purpose of which is to remove all the minute particles of pulp and other finely divided impurities in colloidal or coarse suspension in the liquor.

The purified liquor may then be concentrated by vacuum evaporation. If the final product is to be a dry product, the pectin may be precipitated from the concentrated liquor with alcohol or other precipitating agents, or the dry product be obtained in any other suitable way.

It has been generally believed that the grade or jellifying power of pectin, produced by extraction from cellulosic materials by a process such as that described above, is impaired by high acidities and for this reason the acidity has not been allowed to exceed that represented by a pH of about 2.3. For example, C. M. Conrad, in "A Biochemical Study of the Insoluble Pectic Substances in Vegetables" (American Journal of Botany, XIII, pages 531 to 547, November, 1926), in commenting upon tabular data therein presented (page 531), states that "* * * increasing concentration of acid has a destructive effect upon apple pectin". Furthermore, in the U. S. patent to Leo, No. 1,654,131, page 1, lines 24–27, it is stated:

"That the pectin strength actually deteriorates due to heat in the presence of small acid concentrations has been definitely proven."

The extracts of pectin or pectous bodies, obtained by such processes, contain finely divided impurities of such nature and character that they can not be removed readily. Furthermore the process is disadvantageous in that the extracts contain relatively low concentrations of pectin and therefore require prolonged evaporation so as to increase the concentration of pectin therein. Evaporation of pectin solutions is a delicate operation, requiring the use of low temperatures, as high temperatures reduce the jellifying power or grade of pectin.

During the filtration of these pectin extracts for the removal of finely divided suspended impurities, a great deal of difficulty has been encountered. The impurities are apparently slimy and even the use of filter-aids does not permit the complete and rapid removal of such impurities. Filter-aids made from diatomaceous earth have been tried, but unless such filter-aids are composed of very minute particles so that the interstitial pores of the filter cake formed during filtration are very minute, large quantities of the finely divided suspended particles pass through the filter medium and a cloudy and turbid filtrate results. However, the use of filter-aids composed of very minute particles results in a fairly dense filter cake having very small interstitial pores and this retards the passage of liquor through the cake to an extent sufficient to make the operation rather uneconomical commercially. As a matter of fact, the rate is very slow and a great deal of time, and high pressures, are required to filter a pectin extract containing these finely divided impurities. Filter-aids are obtainable which have coarser particles and, therefore, larger interstitial pores; and these filter-aids permit of high rates of flow. It is impossible, however, to utilize such filter-aids as are capable of producing high rates of flow, for the reason that the filtrates are too cloudy and the pectin obtained from such filtrates makes very cloudy jellies. A high rate of flow during filtration together with a clear filtrate cannot apparently be obtained by the use of prior art methods.

The finished pectin product resulting from the above described process when used to jell pure sugar and acid in aqueous solution has a definite time of set, i. e. time before jellification takes place, which varies with the sugar concentration and the acidity of the jelly. When the sugar concentration lies within the desirable range for preserving, 60 to 70%, and the acidity is such that the taste of the jelly is pleasingly tart, setting of the jelly takes place rapidly. That is to say, the time of setting lies within a range of from a few seconds to possibly somewhat beyond a minute. I mean by "setting" the change from a liquid consistency to a jelly characterized by the properties of solids, particularly rigidity and elasticity. In the case of fruit jellies or jams the time of set is also influenced by the effects which the acids and buffers contained in the fruit have on the acidity of the jelly batch. By acidity here is meant active acidity or effective hydrogen ion concentration. When the acidity has been so adjusted that the taste of the final jelly or jam is pleasingly tart the time of set is short. Because of rapid setting, difficulty is encountered in handling the jelly mix between the preserving kettle and the final package. When setting occurs during this handling period, loss of firmness, texture and appearance of the jelly results.

The difficulty arising from the inherent rapid set of the pectin has been overcome in the prior art by the regulation of acidity in the jelly with the aid of weak acids and buffers but with the consequent sacrifice of flavor in many cases.

A slight retardation of setting has also in some cases been obtained by the use of lactic or malic acid as setting acid. This difference however is only a matter of seconds. Malic acid, for example, in very carefully controlled experiments, using pectin prepared as described above, gave a maximum retardation of 20 seconds in setting time as compared with tartaric acid.

Furthermore, the pectin product made as described above when incorporated into the jelly batch does not greatly alter the viscosity or surface tension of the jelly batch, and the insoluble fruit solids, due to difference in densities, rise to the surface of the jam, there not being sufficient tendency of the pectin to maintain proper suspension of the particles. This rising of the fruit in commercial jam making is commonly eliminated by cooling the batch prior to filling into the final containers thereby sufficiently raising the viscosity. This cooling requires much additional kettle and floor space and is detrimental to the firmness, texture and appearance of the finished jam. This cooling before filling also greatly exposes the jelly or jam batch to contamination by mold spores or other deleterious micro-organisms. Sometimes the cooling before setting is accomplished in the final container in which case the containers must be repeatedly inverted or agitated to keep the pulp uniformly suspended. In still other cases rapid set is allowed to take place by using sufficient acid in the batch. The jelly then holds the fruit in suspension but with the disadvantage that air and scum are likewise entrapped and suspended.

I have discovered that by adjusting the hydrogen ion concentration of the pectin extraction liquor to values hereinafter disclosed, during and after extraction, certain vast improvements in the art of pectin manufacture are brought about and a new, improved pectin product results therefrom.

Accordingly an object of this invention is to provide a pectin product having an inherent long time to set so that it may be used to produce, commercially, jellies of optimum taste, keeping quality, firmness, texture and appearance.

Another object of this invention is to provide a pectin product whose aqueous dispersions have a relatively high viscosity and low surface tension, which makes it particularly suitable for making jams and emulsions because of its property of holding fruit or other solid particles in suspension in the jam, or of holding insoluble solid or liquid particles in an emulsion.

Another object of this invention is to provide a pectin product having an inherent long setting time so that it may be used to produce tart jellies without causing said jellies to set in the jelly kettle or immediately after pouring into containers.

Another object of this invention is to provide a method for regulating the second setting time of pectin during extraction from cellulosic materials.

Another object is to disclose and provide a method of extracting pectin from cellulosic materials whereby a pectin of unusual and desirable characteristics may be obtained.

Another object of this invention is to disclose and provide a process of extracting pectin from cellulosic materials whereby the pectin extract may be readily clarified.

Another object is to disclose and provide a method of treating pectin extracts whereby the removal of finely divided and colloidally dispersed particles from such extract may be carried out with great rapidity and substantial completeness.

The objects and advantages of this invention will be apparent from a description of a preferred process and product embodying the invention and will present themselves to those skilled in the art in the contemplation and use of the invention. In the following description the process is illustrated as applied to the preparation of pectin from the peel of citrus fruits. I desire to be understood to the effect that the process described is given as an illustration of a preferred example of the invention and the invention is not to be limited to the preferred example given, but the process may be modified in various manners, depending upon cellulosic material used during extraction, kind of apparatus and materials employed, etc., without departing from the spirit of the invention.

In describing the invention reference will be had to the appended charts, in which:

Fig. 1 discloses the unexpected effect of increased acidity present during extraction upon the setting time of the extracted pectin.

Figure 2:
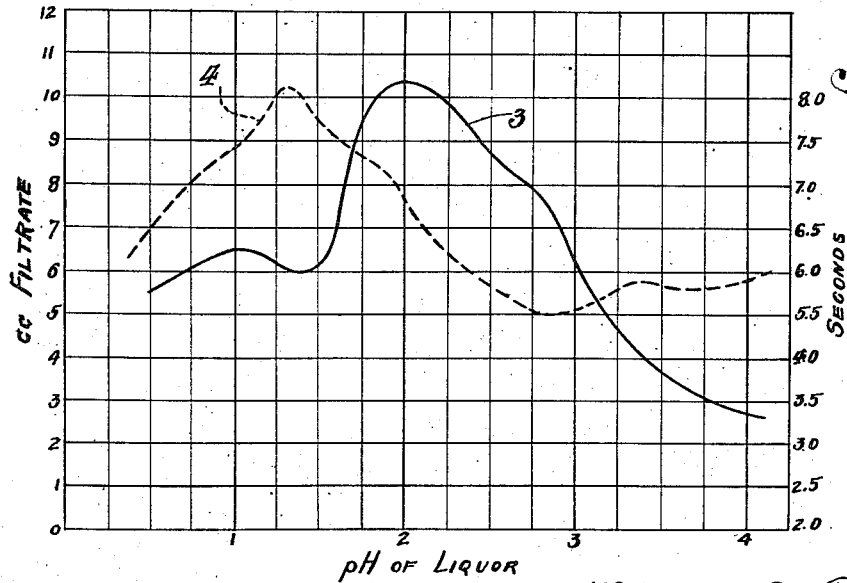

Fig. 2 illustrates the preferred range of acidity of pectin extracts used during filtration or separation of finely divided impurities from said extract, as illustrated by the effect of such acidities upon viscosity and the rate of flow during filtration.

If it is desired to employ citrus fruits, the peel of the citrus fruit (such as may be obtained from any process for expressing the juices or oil from the fruit) may be finely ground and heated to destroy the enzyme, pectinase, according to U. S. Patent No 1,497,884. Two or three volumes of water may now be added followed by sufficient hydrochloric or other suitable acid to acidify the extraction mass to an acidity represented by a pH value of between 1.2 to 1.9. Hydrochloric acid is preferred as it has been found to give most favorable results, but any sufficiently strong acid may be used. I have found that sulphuric acid, nitric acid and oxalic acid have utility in this connection. These acids, together with hydrochloric acid, are exemplary of groups of acids which readily suggest themselves, to one skilled in the art, as suitable strong acids.

Although not economically profitable at the present time, it is possible to employ tartaric acid, citric acid, phosphoric acid and sulphurous acid if used under conditions which permit of proper hydrogen ion concentrations such as use of enclosed digestors when sulphurous acid is used. While the addition of acid has been given as the means of increasing the acidity of the extraction liquor, it is to be understood that any suitable means of obtaining the desired pH indicated is contemplated as being within the scope of this invention. The temperature of the extraction mixture is preferably maintained at 50 to 70° C., during agitation, for a period of approximating 30 minutes. It has been found that, that, in general, peel or pulp from unripe fruit may be advantageously subjected to higher acidities and temperatures for somewhat longer periods of time than peel or pulp from more mature fruit.

The acidity range mentioned hereinabove of between 1.2 to 1.9, although directly opposed to the teachings of the prior art, produces a very desirable pectin product. It has been found possible to regulate the setting time of the resulting pectin by regulating the acidity during the extraction. A definite relationship exists between the pH and setting time of the pectin produced thereby. This relationship is shown further in the accompanying drawing, namely, Fig. 1 wherein pH of the extraction liquor is plotted against setting time. Curve 1 on the drawing indicates the relation between the pH of the extraction liquor and the setting time of the pectins when made up in proper jelly grade into standard sugar jellies.

This curve represents the average effect of extraction pH on setting time for all acids which may be employed and which have been mentioned hereinabove.

In general it would appear, and I have been led to believe, that retardation of setting time is most pronounced with monobasic acids; although I have found that dibasic and tribasic acids give similar effects, and that both organic and mineral acids can desirably be employed.

The dotted curve 2 relates to the HCl extraction data and has been plotted to indicate the relative great efficacy of HCl in imparting a greatly retarded setting time to pectin extracted therewith. This effect is most marked at high acidities, as indicated by the fact that the setting times for pH 1.6 and pH 1.2, with HCl extraction, are 9 minutes and 31 minutes, respectively.

It is to be understood that the precise point or pH at which a pectin of a desired setting time can be obtained may vary somewhat with the cellulosic material being employed as the source of the pectin. For example, although a pectin having a setting time of 9 minutes is obtained by using hydrochloric acid during the extraction of pectin from citrus fruits, still a pectin having a setting time of 9 minutes may be produced at a different pH within the range specified as, for example, when carrots are employed as the source of the pectin.

After extraction, which preferably is carried out in accordance with the method described hereinabove, a preliminary separation may be made, that is, a separation of the coarse pulp particles from the yet turbid extract may be effected with suitable screens, hydraulic presses, filters or other means. Irrespective of the acidic conditions existing during extraction, the extract is difficult to clarify and ordinarily it is impossible to employ a filter-aid capable of forming a highly porous bed permitting the extract to flow therethrough rapidly and still remove or retain the finely divided pulp particles and other colloidal foreign matter. It has been discovered, however, that if the acidity of the extract to be clarified is adjusted properly, filter-aids which normally produce turbid filtrates may be employed and be caused to produce clear filtrates without impairing the high rate of flow characteristics of the filter-aid. In plant practice it has been found possible to employ a calcine diatomaceous filter-aid containing some silica in the form of crystobalite and consisting of relatively coarse particles, and still obtain a clear filtrate at a high rate of flow.

The pectin extract which it is desired to clarify is preferably sampled and its pH determined. If a siliceous filter-aid of high rate of flow is to be used in clarification and filtration, the pH of the pectin extract is adjusted to between 1.2 and 1.6. If the pH of the extract is not within this range, a turbid filtrate will result unless filter-aids containing a large proportion of finer particles and, therefore, incapable of high rate of flow are employed.

In order to secure satisfactory filtration it is not necessary to use for the extraction step an acidified solution having a hydrogen ion concentration of the value needed for a satisfactory filtration. This invention contemplates the adjustment of pH or acidity for two purposes; the acidity during extraction may be adjusted so as to regulate the characteristics of the resulting pectin, and as has been stated before, the preferred range is between 1.2 and 1.9. The acidity of the pectin extract may also be adjusted so as to produce a coagulating effect upon the dispersed and suspended impurities and permitting rapid clarification. This second range may vary with the character of the impurities suspended in the extract and with the character of the filter-aid or other clarifying aid used. As has been stated before, if a siliceous free flowing filter-aid is employed, the preferred range is between 1.2 and 1.6. An acidity represented by a pH value of about 1.8 has utility in this connection, and even lower acidities may be employed with other filter-aids.

In Fig. 2, curve 3 shows the effect of various acidities on the filtration rate of a pectin extract from citrus fruits. The filtration rate has been measured by filtering the acidified pectin extract through filter paper in a funnel maintained at a temperature of 50° C. and recorded as quantity of filtrate obtained in the first ten minutes. Gravity head alone was employed.

It will be seen that the highest rate of filtration occurs when the pectin extract has a pH of 2. Curve 4 also shown in Fig. 2, indicates the time of flow of the acidified pectin extract through a 10 c. c. pipet at 25° C. and is, therefore, a measure of the viscosity of the liquor. It is seen that the viscosity increases with the acidity of the liquor and apparently reaches a peak at about a pH of 1.3.

In actual plant operation, when a siliceous free flowing filter-aid is employed and the liquor filtered under pressure in a suitable filtering apparatus, the highest rates of flow and the clearest filtrates are obtained when the pH of the extract is adjusted to between 1.2 and 1.8 and particularly when the range is between 1.2 and about 1.6.

Acidification of the pectin extract apparently causes a coagulation of suspended impurities to take place, which permits rapid filtration and the production of clear filtrates. The effect obtained by acidifying pectin extracts to various pH has been studied. Twenty-two samples of pectin liquor were prepared to cover a pH of from 0.46 to 4.50. These samples were placed in six ounce bottles and the suspended impurities allowed to settle. The results of the rest are tabulated below.

Table I

| pH of pectin extract | Character of sediment | Character of supernatant liquor |
| --- | --- | --- |
| 0.46 | Dense | Cloudy. |
| 0.78 | do | Turbid. |
| 1.05 | Fluffy | Slightly turbid. |
| 1.15 | Moderately dense | Brilliant. |
| 1.23 | Dense | Do. |
| 1.32 | do | Do. |
| 1.39 | do | Do. |
| 1.47 | do | Clear. |
| 1.58 | do | Slightly turbid. |
| 1.65 | do | Do. |
| 1.74 | do | Turbid. |
| 1.83 | do | Do. |
| 1.94 | do | Cloudy. |
| 2.01 | do | Do. |
| 2.32 | Moderately dense | Very cloudy. |
| 2.57 | do | Do. |
| 2.82 | do | Do. |
| 3.09 | Light | Do. |
| 3.45 | None | Thick suspension. |
| 3.74 | do | Do. |
| 3.97 | do | Do. |
| 4.50 | do | Do. |

It is to be noticed that between the range 1.15 to 1.65 inclusive, the supernatant liquor is either brilliant or only very slightly turbid. Visual examination of the test results shows the effect of acid concentration very clearly.

In addition to the effect on the process of filtration there are other important advantages of the acid concentrations used in accordance with this invention. It is found that high yields of pectin are obtained from the raw material and the liquor contains a high concentration of pectin, thereby requiring less concentration or evaporation. For instance, when the extraction is made with a weak acid such as sulphurous acid, citric acid, etc., at a pH of 2.3 to 3.5, a pectin extract containing about 0.7% of pectin or less, as determined by alcoholic precipitation, is obtained, whereas if hydrochloric acid or other relatively strong acid at a pH of 1.2 to 1.8 is used, the pectinous extract contains about 1.1% of pectin. Furthermore, in the high acidity method herein disclosed, the liquor is not subject to the action of pectin destroying microorganisms and enzymes since these do not function at the pH used.

The remainder of the process usually consists of concentration to produce a liquid product, or of suitable treatment to produce a pectin product in dry form. For example, the pectin in the extract, after partial concentration, may be precipitated with alcohol or suitable salts. The precipitated pectin may then be purified, dried and ground.

In either case, during these steps of the process, part or substantially all of the acidity may, if desired, be neutralized by some suitable base or rendered ineffective by a salt of a strong base and a weak acid, without destroying or lessening the desirable characteristics of the pectin developed by the process embraced by this invention.

The pectin product, so extracted and clarified, in liquid or powdered form, is suitable for certain new and important uses. It is inherently slow setting, that is, jelly made by means of such pectin sets or jellies much more slowly than pectins extracted with weak acids and at low acidities. That is to say, this pectin extracted at pH 1.2 to 1.9, will, with a sugar concentration of 60 to 70% and a pleasingly tart acidity, make jellies that set in from about 2 minutes to about 30 minutes. The very remarkable lengthening of the time of set, moreover, can be more fully appreciated from a comparison of the behavior of this pectin with the behavior of other pectins when made into standard jellies under carefully standardized conditions. In the following Table II, Sample 1 was a powdered commercial apple pectin. Sample 2 was a powdered citrus pectin extracted with acid residual in the fruit material. Sample 3 was pectin obtained from an acidified commercial liquid apple pectin concentrate containing the natural residual apple flavor. Sample 4 was pectin prepared in accordance with U. S. Patent No. 1,497,884. Sample 5 was pectin prepared in accordance with the preferred embodiment of the invention set forth in this specification.

Table II

| Pectin sample | Jelly grade | pH of extraction liquor | Setting time—using 2 cc. standard tartaric acid per 6 oz. glass [1] |
| --- | --- | --- | --- |
| | | | 65% sugar jelly |
| 1 | 140 | About 3.3 | Less than 7 sec. |
| 2 | 225 | 3.3 to 3.5 | 11 sec. |
| 3 | 175 | About 3.3 to 3.4 | 40 sec. |
| 4 | 200 | 2.3 to 2.5 | 77 sec. |
| 5 | 190 | 1.2 to 1.6 | 5 min. 23 sec. |

[1] The standard tartaric acid used in these jellies contains 373.6 grams of the dry acid per 1000 cc. of solution at 20° C.

It will be noted that Sample 5, made in accordance with this invention has a much longer time of set than any of the other pectins. This pectin thereby lends itself readily to use in the manufacture of fruit jellies or other jellies in which all the constituents, in their proper proportions to form a jelly of desirable taste and texture, have been united at the time of introducing into the container, or form, which container of jelly must undergo operations such as capping, washing, labelling and the like, preferably before jellification has taken place.

Furthermore, the aqueous dispersions of this pectin possess a high viscosity and low surface tension, properties which make it particularly desirable as an emulsifier.

The high viscosity and low surface tension combined with the slow setting properties of this pectin product provide a means whereby the art of manufacture of fruit jams is greatly improved.

The fruit pulp and seeds of the jam are caused to remain in substantially uniform suspension during the filling of the containers and subsequent operations and until jellification has taken place. During this time the jam is a viscous fluid from which entrapped air and scum readily separate leaving a clear product. Furthermore, by the use of this pectin, the cooling of the jam or jelly bath prior to filling into containers is eliminated, together with the consequent contamination and other undesirable results.

I desire it to be understood that wherever I have herein spoken of "pH", I have used that term in its commonly accepted meaning, namely, the active acidity, or hydrogen ion activity. It should further be noted that the pH value of a particular material will be found to vary slightly according to the method of determination. The pH values hereinabove set forth were determined by the use of the standard hydrogen electrode in conjunction with a normal calomel half cell and a potentiometer. The instruments were calibrated by methods recommended in Chapters XXIII and XXIV of Clarke's "The Determination of Hydrogen Ions", Third Edition (1928), The Williams and Wilkins Company, Baltimore.

Although particular directions have been given for carrying out the invention, it is to be understood that numerous changes and modifications may be made without departing from the invention. All such changes and modifications as come within the scope of the appended claims are embraced thereby.

I claim:

1. In the manufacture of pectin from cellulosic materials by extraction, the step of adjusting the pH of a pectin extract containing solid impurities to a pH at which clear filtrates may be obtained with a filter-aid capable of high rate of flow, but normally incapable of producing clear filtrates from said pectin extracts, and then filtering said extract with such filter-aid.

2. In the manufacture of pectin from cellulosic materials, the step of filtering impure pectin extracts with a siliceous filter-aid capable of high rate of flow, but normally incapable of producing clear filtrates from such impure extracts, including the step of adjusting the pectin extract to an acidity of between pH 1.2 to 1.6 before filtration.

3. In the manufacture of pectin from cellulosic materials, the step of filtering an impure pectin extract at an acidity of between pH 1.2 to 1.6 with a siliceous filter-aid capable of forming a bed of high porosity.

4. In a process of extracting pectin from cellulosic materials, a method of causing pectin extracts to produce clear filtrates upon filtration with a filter-aid capable of high rate of flow but normally incapable of producing clear filtrates, in which the pH of the pectin extract is adjusted prior to filtration to a point at which clear filtrates are obtained in the extract, and then filtered to produce a clear filtrate.

5. In a process of producing clarified pectin extracts, the steps of adjusting the pH of a pectin extract containing solid impurities to a pH below about 1.9, and then filtering the extract so treated with a filter-aid capable of high rate of flow but normally incapable of producing clear filtrates.

WILLIAM C. PLATT.